(12) United States Patent
Jung et al.

(10) Patent No.: US 8,493,329 B2
(45) Date of Patent: Jul. 23, 2013

(54) KEYPAD ASSEMBLY USING OPTICAL SHUTTER AND LIGHT GUIDE PANEL AND PORTABLE TERMINAL HAVING THE SAME

(75) Inventors: Sun-Tae Jung, Yongin-si (KR); Sung-Soo Park, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 717 days.

(21) Appl. No.: 12/712,830

(22) Filed: Feb. 25, 2010

(65) Prior Publication Data

US 2010/0219059 A1    Sep. 2, 2010

(30) Foreign Application Priority Data

Feb. 27, 2009    (KR) .................. 10-2009-0016851

(51) Int. Cl.
*G09G 5/00*    (2006.01)

(52) U.S. Cl.
USPC .......................................... 345/170; 345/172

(58) Field of Classification Search
USPC ................. 345/168–178; 178/18.01–18.11
See application file for complete search history.

(56) References Cited

U.S. PATENT DOCUMENTS

| 5,422,656 A | * | 6/1995 | Allard et al. .................. 345/173 |
| 6,144,359 A | * | 11/2000 | Grave ........................... 345/102 |
| 6,211,931 B1 | * | 4/2001 | Fukao et al. ................... 349/86 |
| 6,842,170 B1 | | 1/2005 | Akins et al. |

FOREIGN PATENT DOCUMENTS

| JP | 2002-049439 | 2/2002 |
| KR | 20-0438645 | 2/2008 |
| KR | 20-2008-0003087 | 8/2008 |
| KR | 1020080107183 | 12/2008 |

* cited by examiner

*Primary Examiner* — Vijay Shankar
(74) *Attorney, Agent, or Firm* — The Farrell Law Firm, P.C.

(57) ABSTRACT

A keypad assembly includes an optical shutter configured to shield or transmit light according to a voltage applied thereto; a light guide panel configured to guide an internal light generated inside of the keypad assembly and coupled to the interior of the light guide panel; and a symbol pattern layer including at least one symbol pattern illuminated by both the internal light irradiated from the light guide panel and an external light from outside of the keypad assembly that has passed through the optical shutter.

10 Claims, 10 Drawing Sheets

KEYPAD ASSEMBLY USING OPTICAL SHUTTER AND LIGHT GUIDE PANEL AND PORTABLE TERMINAL HAVING THE SAME

PRIORITY

This application claims priority under 35 U.S.C. §119(a) to an application entitled "Keypad Assembly Using Optical Shutter And Light Guide Panel And Portable Terminal Having The Same" filed in the Korean Industrial Property Office on Feb. 27, 2009 and assigned Serial No. 10-2009-0016851, the contents of which are hereby incorporated by reference.

BACKGROUND OF THE INVENTION

1. Field of the Invention

The present invention relates to a keypad assembly provided in a portable device or a portable terminal to receive a key input from the user, and more particularly to a key pad assembly that uses a light guide panel.

2. Description of the Related Art

In recent years, it is increasingly difficult for a user to carry multiple digital application devices with various functions. Digital convergence technologies, in which various application devices are integrated into one (e.g. mobile phone), are developing. For example, various types of mobile phones combined with MP3 players, digital cameras, and game devices are presenting available.

In the digital convergence technologies, there is a need to realize respective input keys of combined devices in a mobile phone in addition to number keys and function keys essential to conduct voice communication. Since there is a large number of input symbols such as Korean letters, alphabet letters, numbers, and special symbols, but the number of realizable buttons is limited, the key limitation problem can be overcome through software but the user faces many inconveniences.

In order to solve the problem, a keypad with a display function has been suggested. In an Liquid Crystal Display (LCD) or Organic Light Emitting Diodes (OLED) display keypad, a touch screen is stacked on an LCD or an OLED and a key map is realized on the LCD or OLED through various software programs.

In other technologies, an electronic paper display keypad with an electronic paper is thin and light, and consumes little power.

However, it is difficult to apply a dome switch, used to provide a click feeling, to an LCD or OLED display keypad. Such an LCD or OLED display keypad is also thick, consumes much power, and has a poor outdoor visibility, making it difficult to identify a key map.

An electronic paper display keypad is limited in expression of colors and thus not widely selected by consumers.

SUMMARY OF THE INVENTION

Accordingly, the present invention has been made to solve at least the above-mentioned problems occurring in the prior art, and the present invention provides a keypad assembly which is thin and light, reduces power consumption, is excellent in color reproduction and visibility, and is designed to produce a click feeling.

In accordance with an aspect of the present invention, there is provided a keypad assembly including an optical shutter configured to shield or transmit light according to a voltage applied thereto; a light guide panel configured to guide and internal light generated inside of the keypad assembly and coupled to the interior of the light guide panel; and a symbol pattern layer including at least one symbol pattern illuminated by both the internal light irradiated from the light guide panel and an external light from outside of the keypad assembly that has passed through the optical shutter.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, embodiments of the present invention will be described with reference to the accompanying drawings. In the following description of the present invention, a detailed description of known functions and configurations incorporated herein will be omitted when it may make the subject matter of the present invention rather unclear.

Figure 1:
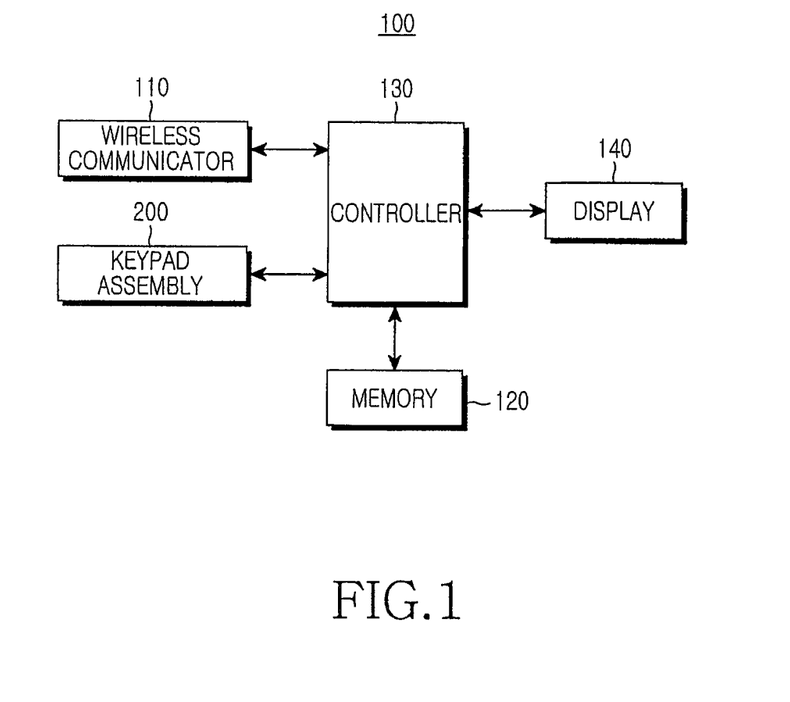
FIG. 1 is a block diagram illustrating a portable terminal including a keypad assembly according the first embodiment of the present invention.

FIG. 1 is a block diagram illustrating a portable terminal including a keypad assembly according the first embodiment of the present invention.

Although the portable terminal 100 of FIG. 1 includes a wireless communicator 110, a keypad assembly 200, a memory 120, a display 140, and a controller 130 only, it may further include a camera, a speaker, a microphone, and the like.

The wireless communicator 110 receives a wireless downstream signal from the air using an antenna, and outputs the downstream data obtained by demodulating the wireless downstream signal to the controller 130. The wireless communicator 110 modulates the upstream data input from the controller 130 to create a wireless upstream signal, and wirelessly transmits the created wireless upstream signal to the air using the antenna. The modulation and demodulation may be preferably performed in a Code Division Multiple Access (CDMA) fashion, but may also be performed in a Frequency Division Multiplexing (FDM) fashion, in a Time Division Multiplexing (TDM) fashion, or the like.

The keypad assembly 200 displays a key map including a plurality of soft buttons under the control of the controller 130, and outputs a key input signal or information to the controller 130 if the user clicks one of the soft buttons. The soft buttons refer to those which are illuminated by external or internal lights to be displayed. Mechanical buttons refer to general push buttons having no display function and having at least one symbol or picture printed on a surface thereof.

The display 140 displays on a screen an image obtained under the control of the controller 130.

The memory 120 stores applications of various functions and images for providing Graphic User Interfaces (GUIs) associated with the applications, databases associated with user information, documents, etc., background images (a menu screen, a standby screen, etc.) necessary for driving the portable terminal 100 or management programs, and the like.

The controller 130 provides a user interface through the display 140, provides various modes of key maps through the keypad assembly 200, and performs a program operation corresponding to a key input of the user through the keypad assembly 200, i.e. a program operation such as output of a character on the display 140 or a calling service.

Figure 2A:
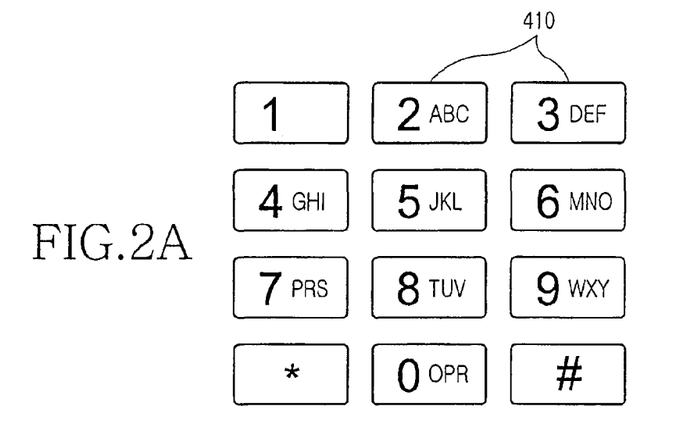
FIGS. 2A, 2B and 2C are diagrams illustrating various modes of key maps displayed on the keypad assembly of FIG. 1.
Figure 2B:
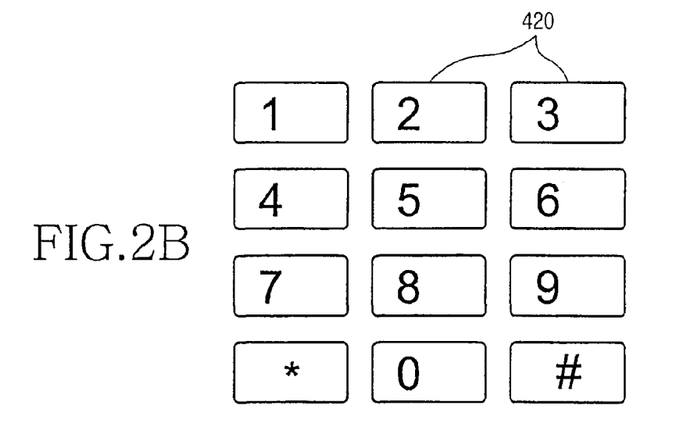
Figure 2C:
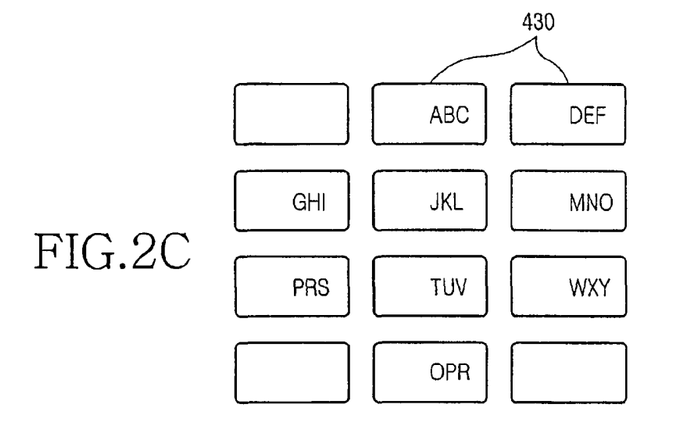

FIGS. 2A, 2B and 2C illustrate various modes of key maps displayed on the keypad assembly 200.

FIG. 2A illustrates a plurality of soft buttons 410 displayed on the keypad assembly 200, each of which has at least one number, symbol, or alphabet letter. FIG. 2B illustrates a plurality of soft buttons 420 displayed on the keypad assembly 200, each of which has at least one number or symbol. FIG. 2C illustrates a plurality of soft buttons 430 displayed on the keypad assembly 200, each of which has alphabet letters or is vacant.

Figure 3:
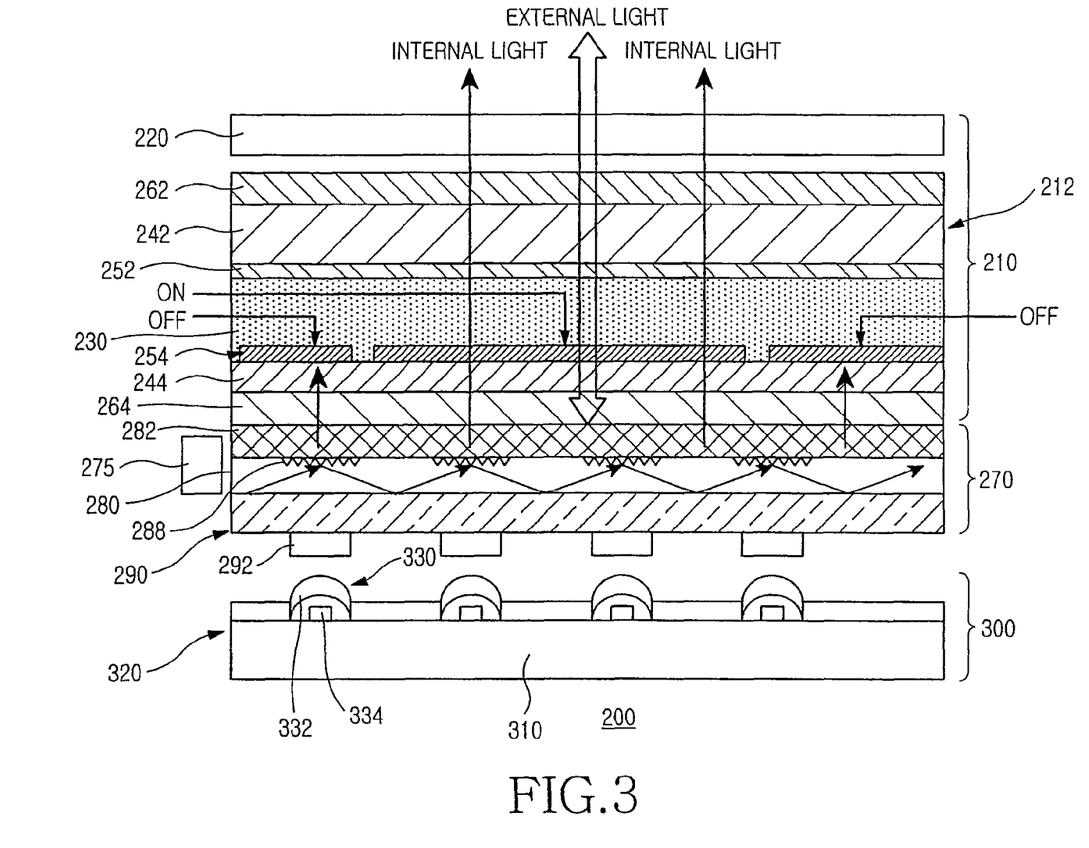
FIG. 3 is a diagram illustrating the keypad assembly of FIG. 1.

FIG. 3 is a diagram illustrating a keypad assembly according to the first embodiment of the present invention. The keypad assembly 200 includes an optical shutter 210, a backlight unit 270 having a symbol pattern layer 282, and a switch substrate 300.

The optical shutter 210 includes a liquid crystal display device 212 having a plurality of pixels for shielding or transmitting light according to voltages applied to the pixels, and a cover layer 220.

The cover layer 220 is a transparent layer positioned at the topmost layer of the keypad assembly 200 to contact with the user input unit, and is provided to protect the interior of the keypad assembly 200. The cover layer 220 may selectively be a touch panel for realizing a touch screen.

The peripheries of the soft buttons or the periphery of the keypad may be printed in color or in black and white on the top surface of the cover layer 220 to specify the input position of the user. For example, a lattice pattern (i.e. a pattern in which transverse and longitudinal lines perpendicularly cross each other), a rectangular pattern, or a combination thereof may be displayed on the top surface of the cover layer 220.

Figure 4:
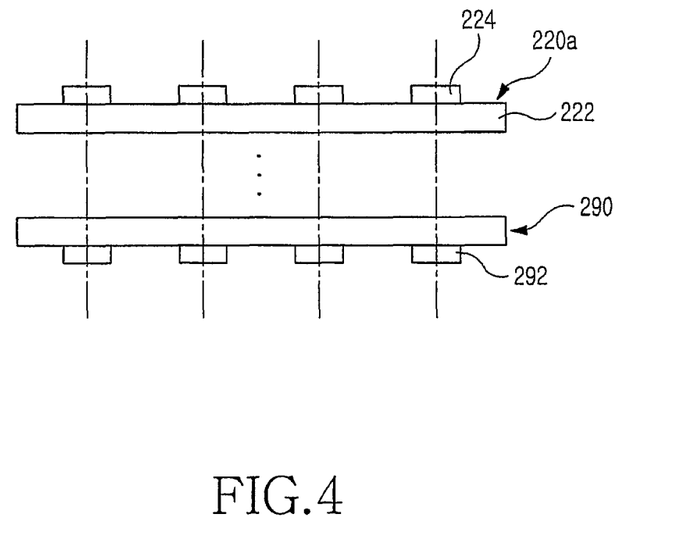
FIG. 4 is a diagram illustrating a cover layer according to another embodiment of the present invention.

FIG. 4 is a diagram illustrating a cover layer according to another embodiment of the present invention. The cover layer 220a includes a substrate 222, and a plurality of key buttons 224 disposed on the top surface of the substrate 222. The key buttons 224 may be attached to the top surface of the substrate 222 using an adhesive or be integrally formed with the substrate 222 through injection molding. The key buttons 224 may be any shape such as a rectangular block, a circular column, an elliptical column, or the like.

Turning again to FIG. 3, the liquid crystal display device 212 includes a liquid crystal layer 230, and upper and lower glass substrates 242 and 244 disposed on and under the liquid crystal layer 230, respectively. A pixel electrode layer 254 is positioned on the top surface of the lower glass substrate 244, and a common electrode layer 252 having a plate-like shape with no pattern is stacked on the bottom surface of the upper glass substrate 242. The liquid crystal display device 212 further includes upper and lower polarization plates 262 and 264 disposed on and under the liquid crystal layer 230 and configured to linearly polarize input light. The polarization directions of the upper and lower polarization plates 262 and 264 are perpendicular to each other, the upper polarization plate 262 is positioned on the top surface of the upper glass substrate 242, and the lower polarization plate 264 is positioned on the bottom surface of the lower glass substrate 244. A general transparent LCD, a sematic LCD having a specific color, and a cholesteric LCD whose color changes according to temperature, or the like, may be used as the liquid crystal display device 212.

The pixel electrode layer 254 has various electrode patterns to indicate the peripheries of the soft buttons, the periphery of the keypad, Korean letters, alphabet letters, numbers, and symbols including special symbols and icons (e.g. a clock icon, a telephone icon, arrow icons, a stop icon, etc.).

The operation of the liquid crystal display device 212 may be of an active matrix drive type or of a segment drive type according to the aspect of the pixel electrode layer 254.

Figure 5:
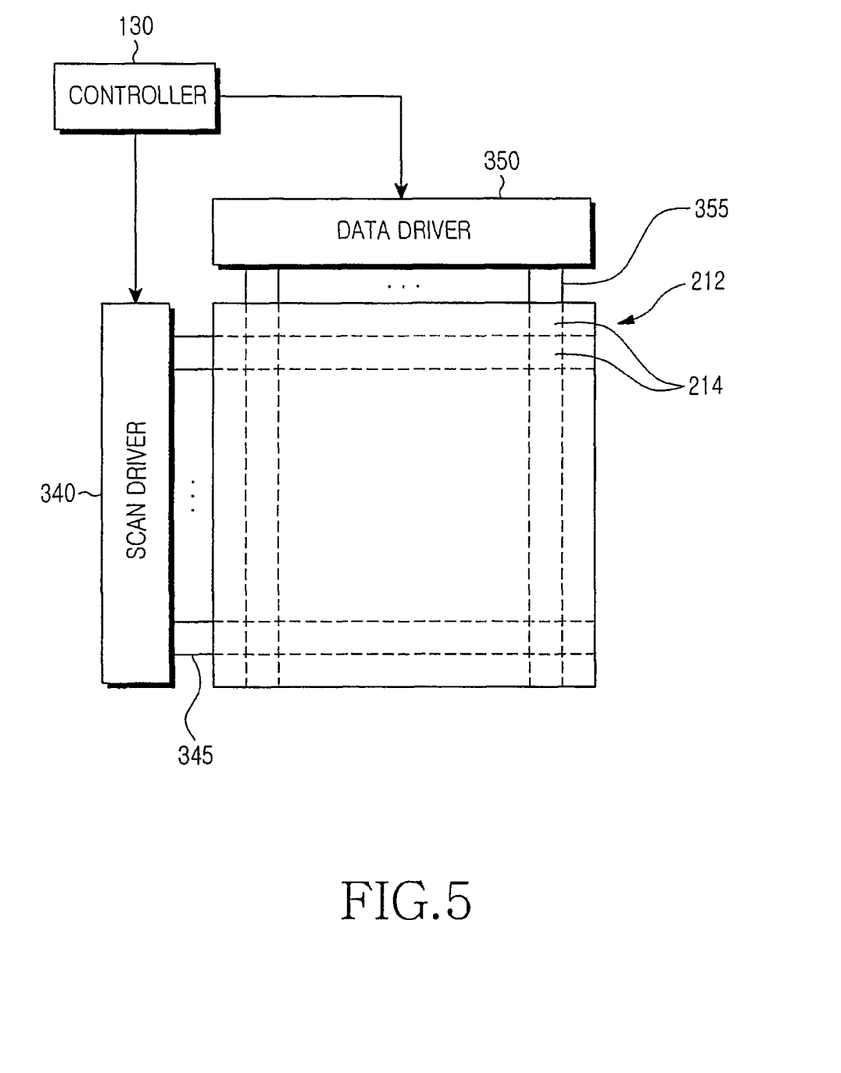
FIGS. 5 and 6 are diagrams for explaining an active matrix type liquid crystal display device.
Figure 6:
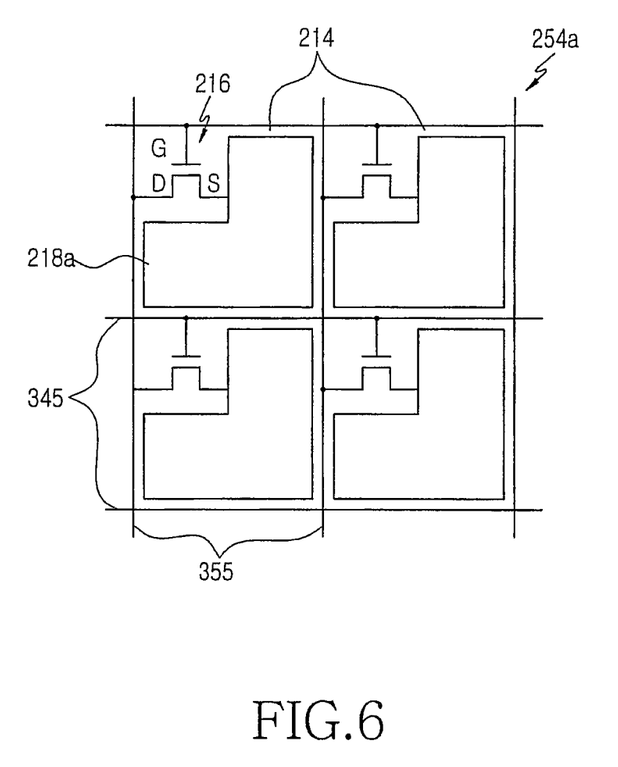

FIGS. 5 and 6 are diagrams for explaining an active matrix drive type liquid crystal display device. FIG. 5 illustrates a drive unit of the liquid crystal display device, and FIG. 6 illustrates a circuit view of a pixel electrode layer.

The liquid crystal display device 212 includes a plurality of pixels 214 configured to shield or transmit lights according to applied voltages. The pixel electrode layer 254a has a plurality of pixel electrodes 218a which are in a one-to-one correspondence with the pixels 214 and each of which is connected to a scan line 345 and a data line 355 through a Thin Film Transistor (TFT) 216. Each thin film transistor 216 has a gate (G), a drain (D), and a source (S). The gate (G) is connected to the scan line 345, the drain is connected to the data line 355, and the source (S) is connected to the pixel electrode 218a. A scan driver 340 sequentially supplies address signals to the scan lines 345, and a data driver 350 supplies data signals to the data lines 355. Each thin film transistor 216 acts as an ON/OFF switch and is switched on only when the address and data signals are applied to both the scan line 345 and the data line 355, and a voltage is applied to the pixel electrode 218a when the thin film transistor 216 is on. The common electrode 252 acts as the ground. Each pixel electrode 218a transmits incident light when a voltage is applied to it, and shields incident light when no voltage is applied to it. For example, when the keypad assembly 200 is intended to display a symbol of 'A', the liquid crystal display device 212 applies a voltage to corresponding pixels 218a to obtain a pattern of 'A'. The light from the outside of the keypad assembly 200 is reciprocally transmitted through the corresponding pixels 218a of the symbol pattern twice and the light created within the keypad assembly 200 is transmitted through the corresponding pixels 218a of the symbol pattern once, and the internal and external (i.e. ambient) light illuminates the symbol 'A' of the symbol pattern layer 282 so that the keypad assembly 200 displays the symbol of 'A'.

Figure 7A:
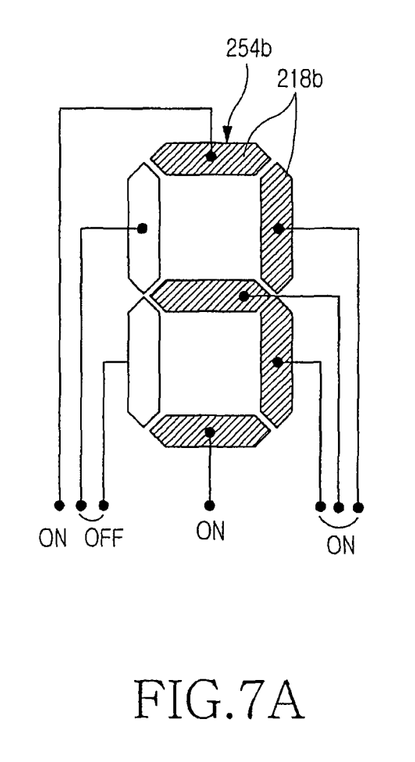
FIGS. 7A and 7B are diagrams for explaining a segment type liquid crystal display device.
Figure 7B:
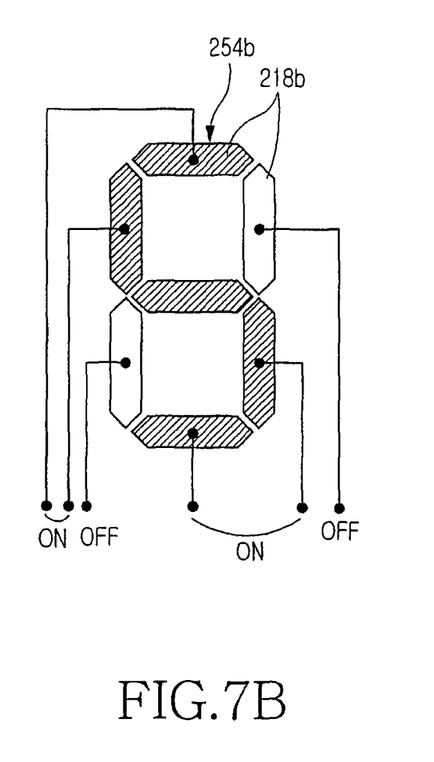

FIGS. 7A and 7B are diagrams for explaining a segment drive type liquid crystal display device. An electrode pattern on a pixel electrode layer 254b is illustrated in FIGS. 7A and 7B.

The pixel electrode layer 254b includes a plurality of segments 218b corresponding to a plurality of respective pixels. One electrode pattern corresponding to one symbol corresponds to one segment or a combination of segments. As illustrated, in a combination of segments 218b the entire shape of which indicates '8', '3' may be indicated as in FIG.

7A or '5' may be indicated as in FIG. 7B, by changing the locations and numbers of segments to which a voltage is applied.

In the embodiment of the present invention, although a plurality of segments 218b are allocated to one symbol, one segment may be allocated to one symbol. That is, one symbol such as '8' may be displayed with one segment not by separating the illustrated segments 218b but by continuously connecting them.

Figure 8:
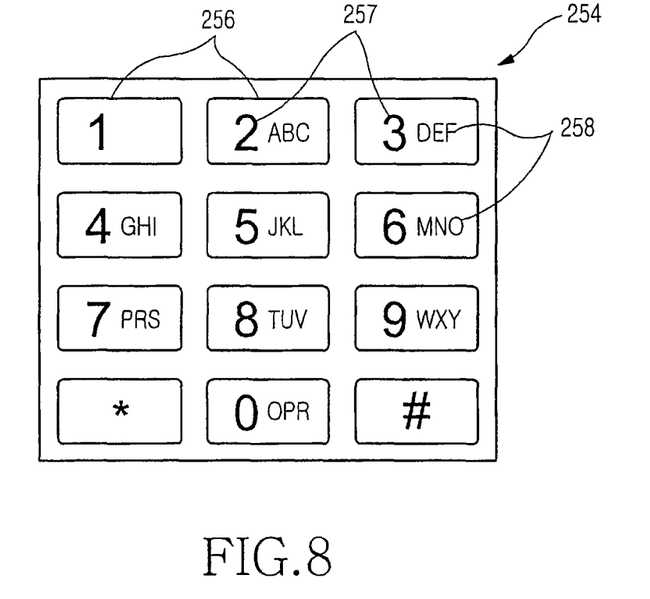
FIG. 8 is a diagram illustrating a pixel electrode layer of FIG. 1.

FIG. 8 is a diagram illustrating a pixel electrode layer 254 of FIG. 3. The patterns 256 to 258 on the pixel electrode layer 254 are classified into groups depending on their type, and a voltage may be applied to the patterns depending on the groups they belong to. For example, the electrode patterns of the pixel electrode layer 254 are classified into a first group 256 including the peripheries of soft buttons, a second group 257 including numbers, and special symbols, and a third group 258 including alphabet letters. In order to provide a key map of FIG. 2B, the key assembly 200 displays numbers and special symbols only by applying a voltage only to the first and second group 256 and 257 and no voltage to the third group 258. In order to provide a key map of FIG. 2C, the key assembly 200 displays alphabet letters only by applying a voltage only to the first and third groups 256 and 258 and no voltage to the second group 257.

Returning again to FIG. 3, the backlight unit 270 includes a symbol pattern layer 282, a light source 275, a light guide panel 280, and an elastic layer 290.

The symbol pattern layer 282 is positioned on the top surface of the light guide panel 280, and includes a plurality of patterns. Some of the incident light is reflected on the symbol pattern layer 282, and the remaining light is transmitted through it.

Figure 9:
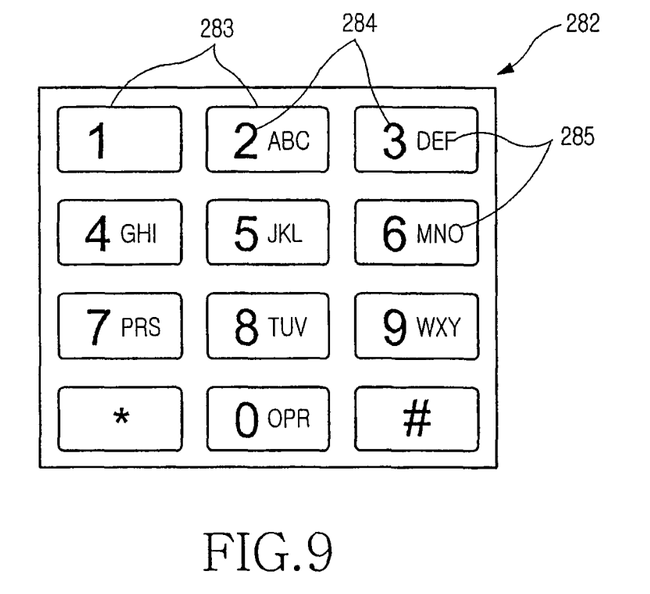
FIG. 9 is a diagram illustrating a symbol pattern layer of FIG. 1.

FIG. 9 is a diagram illustrating the symbol pattern layer 282 of FIG. 3. As illustrated, the symbol pattern layer 282 includes symbol patterns such as the peripheries 283 of soft buttons, numbers/special symbols 284, and alphabet letters 285, and the symbol patterns 283 to 285 are arranged with the corresponding electrode patterns 256 to 258 having the same shapes. The symbol pattern layer 282 may be a film in which symbol patterns are printed or a layer printed on the top surface of the light guide panel 280.

The light source 275 is disposed such that its light emitting surface faces a first side surface of the light guide panel 280. The light emitted from the light source 275 is coupled to the interior of the light guide panel 280 through the first side surface of the light guide panel 280. The light source 275 may be a white Light Emitting Diode (LED), a combination of Red, Green, Blue (RGB) laser diodes, a single-color laser diode, or the like.

Various color patterns may be displayed through a color combination of the liquid crystal display device 212, the light source 275, and the symbol pattern layer 282.

When the symbol patterns 283 to 285 of the symbol pattern layer 282 are white, different colors of lights are allocated to a plurality of groups of symbol patterns 283 to 285, so that the peripheries 283 of the soft buttons may be internally illuminated in red, the numbers/special symbols 284 in green, and the alphabet letters 285 in blue, or the entire symbol patterns 283 to 285 may be internally illuminated in one of red, green, or blue.

When the light source 275 is a white light emitting diode, the peripheries 283 of the soft buttons may be printed in red, the numbers/special symbols 284 in green, and the alphabet letters second group of symbol patterns 285 in blue.

The light guide panel 280 may have various shapes such as a rectangular plate having a top surface, a bottom surface, and first to fourth side surfaces, and is positioned on the top surface of the elastic layer 290 to guide the light coupled to the interior of the light guide panel 280. The coupled light propagates from the first side surface of the light guide panel 280 to the second side surface opposite to the first side surface. Then, the first side surface of the light guide panel 280 refers to a side surface to which the internal light is coupled. The light coupled to the interior of the light guide panel 280 undergoes total internal reflection.

The light guide panel 28b includes a plurality of light extracting patterns 288 which extract some of the light propagating into the light guide panel 280 outside the light guide panel 280 to illuminate the symbol pattern layer 282. The light extracting patterns 288 are formed on the top surface of the light guide panel 280. The light extracting patterns 288 may be formed on the bottom surface of the light guide panel 280. The incident light is transmitted, deflected, reflected, scattered or diffracted by the light extracting pattern 288 toward the symbol pattern layer 282. Each light extracting pattern 288 may be at least one V-shaped body (a groove or a recess in which a cross-section perpendicular to its lengthwise direction is V-shaped) or a plurality of pyramid grooves or recesses formed on the top surface of the light guide panel 280. When each light extracting pattern 288 has a V-shaped body, the V-shaped body may extend from the third side surface of the light guide panel 140 to the fourth side surface opposite to the third side surface. The V-shaped body may have a saw-toothed shape, or may have a shape modified more or less according to design data.

In addition, each light extracting pattern 288 may have a plurality of recesses of various shapes and a plurality of bosses or protrusions formed on the top surface of the light guide panel 280, if necessary. For example, each light extracting pattern 288 may have a plurality of recesses and a plurality of bosses, and the recesses and bosses may have various shapes such as semi-spheres and tetrahedrons. The light extracting pattern 288 may be realized with a reflection, scattering or diffraction pattern formed by scratching or printing, if necessary.

The light extracting pattern 288 may be uniformly or non-uniformly distributed on the entire top surface of the light guide panel 280, if necessary.

As the light within the light guide panel 280 is damped while propagating from the first side surface adjacent to the light emitting device 275 to the second side surface, the luminance distribution on the top side of the light guide panel 280 is reduced as it goes from the first side surface of the light guide panel 280 to the second side surface. In order to solve the non-uniformity of luminance, the density of the light extracting pattern 280 gradually increases with reference to a same entire pattern size as it goes from the first side surface of the light guide plate 280 to the second side surface. The density of each light extracting pattern 288 may be changed by varying their number or size, and the density of the light extracting pattern 288 may be defined as the area occupied by the light extracting pattern 288 per unit area.

As illustrated, each light extracting pattern 288 is arranged to correspond to the periphery of a soft button or a symbol pattern of the symbol pattern layer 282 or a soft button displayed on the keypad assembly, and preferably has an area greater than that of the soft button for uniform illumination. The light undergoing total reflection within the light guide panel 280 is introduced into the light extracting pattern 288, and since most of the light transmitted, deflected, reflected, scattered or diffracted by the light extracting pattern 288 does not satisfy the total reflection condition within the light guide panel 280 (i.e. the incident angle of the lights are less than a threshold angle), it is transmitted though the top surface of the light guide panel 280 and irradiated toward the symbol pattern layer 282. The emitted light is transmitted through the symbol pattern layer 282 and the optical shutter 210 to be emitted outside the keypad assembly 200. The light that passes by without being emitted outside or diffracted by the light extracting pattern 288 may continuously propagate into the light guide panel 280 while satisfying the total reflection condition.

The elastic layer 290 is disposed such that its top surface faces the bottom surface of the light guide panel 280, and is adhered or attached to the bottom surface of the light guide panel 280. The elastic layer 290 has elasticity, supports the light guide panel 280, and restores the shape of the deformed light guide panel 280. The elastic layer 290 is restored to its original shape after being deformed due to its self-restoring force. The light guide panel 280 and the elastic layer 290 may be formed of highly transparent rubber materials each having a low hardness, a large elastic strain, a high elasticity, and a high transparency, and is preferably formed of polyurethane, silicon, or the like.

The bosses 292 are disposed at the bottom end of the elastic layer 290. The bosses 292 may be integrally formed with the elastic layer 290 with a material the same as or different from that of the elastic layer 290, or may be attached to the bottom surface of the elastic layer 290 after being formed of a polycarbonate or acryl resin. The bosses 292 may have any shape such as a cone, a trapezoidal hexahedron, or the like. Each boss 292 is arranged to correspond to a light extracting pattern or a soft button displayed on the keypad assembly. The size and shape of each boss 292 may be set, considering the size of a dome 332 of the switch substrate 300. For example, in the case of a semi-spherical dome 332 having a width of 5 mm, the boss 292 may have a width of 2 mm and a thickness of 0.2 to 0.3 mm.

Alternatively, when the light guide panel 280 has a sufficient elasticity and a self-restoring force, the elastic layer 290 may be removed to attach or integrally form the bosses 292 to and with the bottom surface of the light guide panel 280.

The switch substrate 300 includes a Printed Circuit Board (PCB) 310 and a dome sheet 320.

The printed circuit board 310 includes a plurality of conductive contact members 334 formed on the top surface thereof, and each contact member 334 forms a switch 330 together with a dome 332. The switch 330 is arranged to correspond to a boss 334.

The dome sheet 320 is attached to the top surface of the printed circuit board 310, and has a plurality of semi-spherical conductive domes 332 each of which completely covers a contact member 334.

If the user pushes one of the soft buttons visually displayed on the cover layer 220, some portion (i.e. some portion of the optical shutter 210 and the backlight unit 270) of the keypad assembly 200 located under the soft button is deformed so that a boss 292 corresponding to the deformed portion presses a dome 332. The pressed dome 332 electrically contacts with a contact member 334 (consequently, the switch 330 is turned on). A key input signal generated due to the switch-on operation is output to the controller 130.

When the boss 292 is formed of a rubber material, since the surface of the boss 292 is sticky, the dome 332 is apt to become attached to the boss 292. Therefore, the surface of the dome 332 may be roughly processed or coated with a release agent to be less adhesive. Alternatively, the boss 292 may be attached to the top surface of the dome 332 without being formed in the elastic layer 290.

Figure 10:
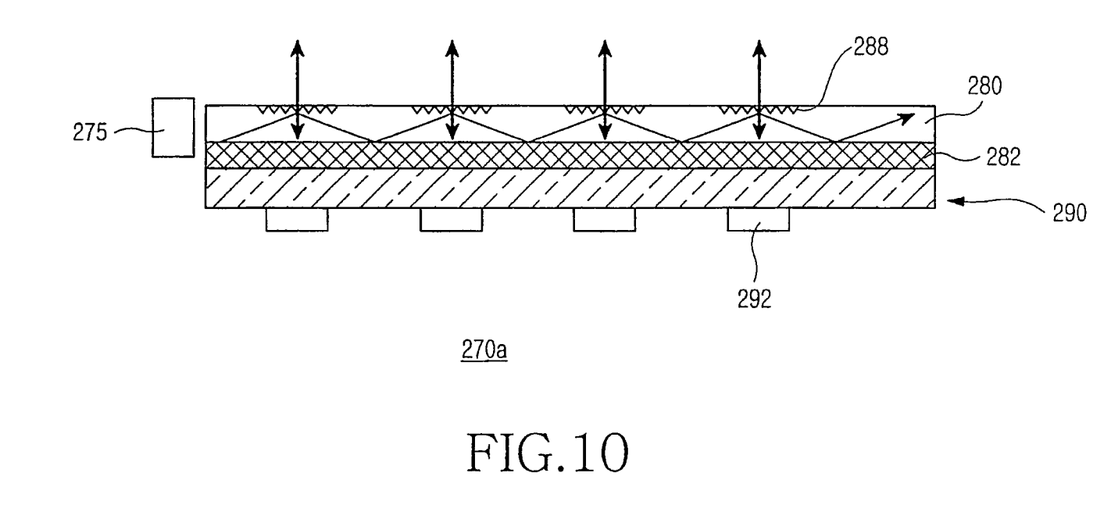
FIG. 10 is a diagram illustrating a backlight unit according to another embodiment of the present invention.

FIG. 10 illustrates a backlight unit according to another embodiment of the present invention. The backlight unit 270*a* has a structure similar to the backlight unit 270 of FIG. 3, but is different from backlight unit 270 only in that the positions of the symbol pattern layer 282 and the light guide panel 280 are reversed.

The light introduced into the light guide panel 280 from outside of the keypad assembly 200 is transmitted through the light guide panel 280 to be introduced into the symbol pattern layer 282, and the external light reflected on the symbol pattern layer 282 is transmitted through the light guide panel 280 to be introduced into the optical shutter 210.

The light which is generated inside of the keypad assembly 200 and coupled into the light guide panel 280, is introduced into the light extracting pattern 288, and since most of the light reflected, scattered or diffracted by the light extracting pattern 288, does not satisfy the total reflection condition within the light guide panel 280 (when the incident angle is less than a threshold angle), it is transmitted through the bottom surface of the light guide panel 280 to be irradiated toward the symbol pattern layer 282. The irradiated light is introduced into the symbol pattern layer 282, and the internal light reflected by the symbol pattern layer 282 is transmitted through the light guide panel 280 and introduced into the optical shutter 210.

Figure 11:
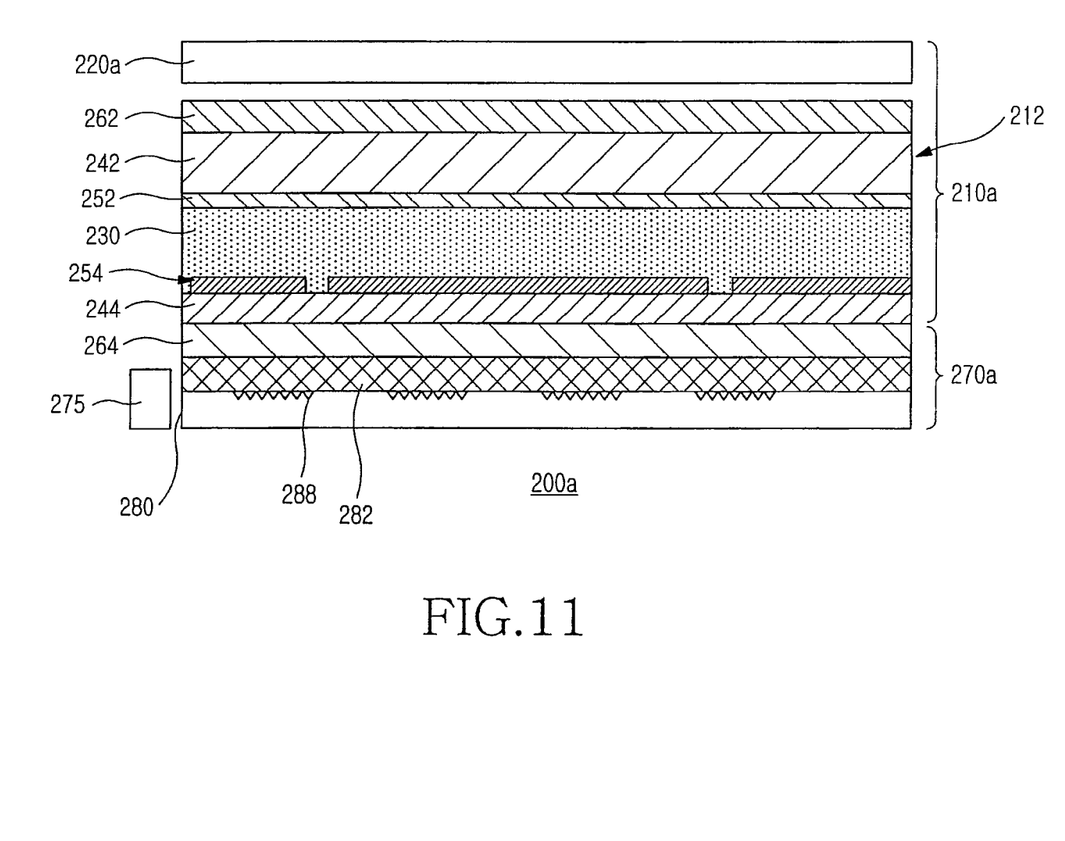
FIG. 11 is a diagram illustrating a keypad assembly according to the second embodiment of the present invention.

FIG. 11 illustrates a keypad assembly according to the second embodiment of the present invention. The keypad assembly 200*a* has a structure similar to the keypad assembly 200 of FIG. 3, and is different from keypad assembly 200 only in that a touch panel 220*a* is used instead of the cover layer 220 and, accordingly, the elastic layer and the switch substrate of the backlight unit are removed.

The touch panel 220*a* is disposed on the top side of the liquid crystal display device 212. If a user input means such as a finger or a stylus pen contacts with the top surface of the touch panel 220*a*, a key input interrupt is generated and a key input signal or information containing an input coordinate and an input state is output to the controller 130 under the control of the controller 130.

Other variations of the invention are contemplated. For example, the symbol pattern layer may be designed without any symbol pattern, but to partially perform a transmission function and partially perform a reflection function, or to perform only a reflection function when disposed under the light guide panel. When performing only a reflection function, the symbol pattern layer may be realized with a high reflection film coated on the bottom surface of the light guide panel.

In addition, referring to FIG. 3, the light source may be surrounded by a shielding tape or a light absorbing member (including a structural body), a light guide tape may be attached to a side surface of the light guide panel, or a light absorbing or light reflecting material may be coated on the side surface of the light guide panel.

The keypad assembly according to the present invention has the following advantages.

First, since the keypad assembly is illuminated by a light guide panel and an external light, its visibility and power consumption efficiency is dramatically increased.

Second, a portable terminal including the keypad assembly provides a key map dedicated to its function, thereby providing an intuitive user interface. For example, the portable terminal may display only numbers during a telephone connection, may display letter sets during input of letters, or may display only upward, downward, rightward, and leftward arrows, or play icons, stop icons, forward icons, and backward icons during use of a multimedia function.

Third, the keypad assembly may freely express colors using the light source, the liquid crystal display device, and the symbol pattern layer and may readily employ a dome switch, thereby providing various designs and enhancing the satisfaction of the user.

While the invention has been shown and described with reference to certain embodiments thereof, it will be understood by those skilled in the art that various changes in form and details may be made therein without departing from the spirit and scope of the invention as defined by the appended claims.

What is claimed is:

1. A keypad assembly comprising:
   an optical shutter configured to shield or transmit light according to a voltage applied thereto;
   a light guide panel configured to guide an internal light generated inside of the keypad assembly and coupled to the interior of the light guide panel through a first side surface of the light guide panel; and
   a symbol pattern layer including at least one symbol pattern illuminated by both the internal light irradiated from the light guide panel and an external light from outside of the keypad assembly that has passed through the optical shutter,
   wherein the internal light propagates from the first side surface of the light guide panel to a second side surface of the light guide panel opposite to the first side surface and undergoes total internal reflection.

2. The keypad assembly as claimed in claim 1, further comprising a switch substrate including at least one switch arranged to correspond to the at least one symbol pattern.

3. The keypad assembly as claimed in claim 1, wherein the optical shutter comprises:
   a pixel electrode layer having at least one electrode pattern with a shape corresponding to the symbol pattern;
   a common electrode layer; and
   a liquid crystal layer interposed between the pixel electrode layer and the common electrode layer to shield or transmit light according to a voltage applied between the pixel electrode layer and the common electrode layer.

4. The keypad assembly as claimed in claim 1, further comprising at least one light source configured to couple light to the interior of the light guide panel.

5. The keypad assembly as claimed in claim 1, further comprising at least one light extracting pattern configured to extract light propagating into the light guide panel to the outside of the light guide panel to introduce the extracted light into the symbol pattern layer.

6. The keypad assembly as claimed in claim 2, further comprising at least one boss disposed under the light guide panel to correspond to the switch.

7. The keypad assembly as claimed in claim 2, further comprising at least one key button disposed at a top end of the optical shutter to correspond to the switch.

8. The keypad assembly as claimed in claim 2, further comprising an elastic layer in which the light guide panel is positioned on a top surface of the elastic layer and configured to restore the light guide panel to an original position after the light guide panel is deformed.

9. The keypad assembly as claimed in claim 1, further comprising a touch panel disposed above the optical shutter to detect an input of a user.

10. A portable terminal comprising:
    an optical shutter configured to shield or transmit light according to a voltage applied thereto;
    a light guide panel configured to guide an internal light generated inside of the portable terminal and coupled to the interior of the light guide through a first side surface of the light guide panel; and
    a symbol pattern layer including at least one symbol pattern illuminated by both the internal light irradiated from the light guide panel and an external light from outside of the portable terminal that has passed through the optical shutter,
    wherein the internal light propagates from the first side surface of the light guide panel to a second side surface of the light guide panel opposite to the first side surface and undergoes total internal reflection.

* * * * *